(12) United States Patent
Garabello et al.

(10) Patent No.: US 9,234,574 B2
(45) Date of Patent: Jan. 12, 2016

(54) DEVICE FOR SELECTION AND ENGAGEMENT OF THE GEARS OF A GEARBOX FOR MOTOR VEHICLES

(71) Applicant: C.R.F. Societa Consortile per Azioni, Orbassano (Torino) (IT)

(72) Inventors: Marco Garabello, Turin (IT); Gianluigi Pregnolato, Turin (IT); Valter Pastorello, Turin (IT); Andrea Piazza, Turin (IT)

(73) Assignee: C.R.F. SOCIETA CONSORTILE PER AZIONI, Orbassano (Torino) (IT)

( * ) Notice: Subject to any disclaimer, the term of this patent is extended or adjusted under 35 U.S.C. 154(b) by 223 days.

(21) Appl. No.: 13/911,292

(22) Filed: Jun. 6, 2013

(65) Prior Publication Data
US 2014/0083227 A1 Mar. 27, 2014

(30) Foreign Application Priority Data
Sep. 21, 2012 (EP) ..................................... 12185356

(51) Int. Cl.
*F16H 59/02* (2006.01)
*F16H 63/30* (2006.01)
*F16H 61/24* (2006.01)

(52) U.S. Cl.
CPC .............. *F16H 59/02* (2013.01); *F16H 63/302* (2013.01); *F16H 2061/246* (2013.01); *Y10T 74/20177* (2015.01)

(58) Field of Classification Search
CPC .. F16H 59/02; F16H 63/302; Y10T 74/20177
USPC .......... 74/473.24–473.28, 473.3–473.36, 335
See application file for complete search history.

(56) References Cited

U.S. PATENT DOCUMENTS

| | | | | |
|---|---|---|---|---|
| 3,357,276 A | * | 12/1967 | Andreevich et al. | .......... 475/209 |
| 4,022,079 A | * | 5/1977 | Hidaka | ...................... 74/473.21 |
| 4,277,983 A | * | 7/1981 | Izumi et al. | ................ 74/473.24 |
| 4,497,216 A | * | 2/1985 | Kawamoto | ................ 74/473.25 |
| 4,510,819 A | * | 4/1985 | Inui | ............................ 74/473.22 |
| 4,531,418 A | | 7/1985 | Takahasi et al. | |
| 4,572,020 A | * | 2/1986 | Katayama | ................. 74/473.21 |

(Continued)

FOREIGN PATENT DOCUMENTS

EP 2 372 197 10/2011

OTHER PUBLICATIONS

Search Report for EP 12185356.8 dated Mar. 8, 2013.

*Primary Examiner* — William Kelleher
*Assistant Examiner* — Bobby Rushing, Jr.
(74) *Attorney, Agent, or Firm* — Nixon & Vanderhye P.C.

(57) ABSTRACT

A device for selection and engagement of the gears of a gearbox for motor vehicles has a control shaft mounted rotatable and axially movable with respect to the casing. Mounted on the shaft is a hub having an engagement finger for controlling gear engagement devices, which is configured to oscillate in the space between two fingers of a selection mask, which is mounted on the shaft axially movable therewith and is guided with respect to the casing so as not to follow rotation of the shaft and the hub when a gear is engaged. During displacement of the engagement finger towards an extreme position preliminary to the engagement of the reverse gear, the selection mask is forced to move temporarily into a rotated position, wherein it actuates one or more of the selector devices of the forward gears to enable silent engagement of the reverse gear.

8 Claims, 8 Drawing Sheets

(56) References Cited

U.S. PATENT DOCUMENTS

| | | | | |
|---|---|---|---|---|
| 4,581,950 A | * | 4/1986 | Schrape et al. | 74/411.5 |
| 4,601,214 A | * | 7/1986 | Fukuchi | 74/473.24 |
| 4,605,109 A | * | 8/1986 | Fukuchi et al. | 192/219 |
| 4,785,681 A | * | 11/1988 | Kuratsu et al. | 74/339 |
| 4,852,421 A | * | 8/1989 | Kerboul | 74/473.21 |
| 4,892,001 A | * | 1/1990 | Meyers et al. | 74/473.25 |
| 5,119,917 A | * | 6/1992 | Fujii | 192/218 |
| 5,197,003 A | * | 3/1993 | Moncrief et al. | 434/71 |
| 5,385,223 A | * | 1/1995 | Certeza | 192/219 |
| 5,560,254 A | * | 10/1996 | Certeza | 74/473.27 |
| 5,778,728 A | * | 7/1998 | Deidewig et al. | 74/473.25 |
| 6,334,371 B1 | * | 1/2002 | Stengel et al. | 74/473.12 |
| 6,736,020 B2 | * | 5/2004 | Koyama et al. | 74/335 |
| 2005/0239596 A1 | * | 10/2005 | Giefer et al. | 477/96 |
| 2011/0138958 A1 | * | 6/2011 | Kirchner | 74/473.25 |
| 2012/0083958 A1 | * | 4/2012 | Ballard | 701/22 |

* cited by examiner

FIG. 8

DEVICE FOR SELECTION AND ENGAGEMENT OF THE GEARS OF A GEARBOX FOR MOTOR VEHICLES This application claims priority to EP Patent Application No. 12185356.8 filed 21 Sep. 2012, the entire content of which is hereby incorporated by reference.

FIELD OF THE INVENTION

The present invention relates to a device for selection and engagement of the gears of a motor-vehicle gearbox, comprising:
- a casing;
- a control shaft mounted rotatable and axially movable with respect to the casing;
- an engagement hub mounted on the control shaft and connected in rotation with respect thereto, said engagement hub having a radial engagement finger, for controlling elements for actuating the gears of the gearbox, wherein said radial engagement finger is configured to oscillate in the space comprised between two fingers of a selection mask, said selection mask being mounted on the control shaft and being moreover axially movable with the latter; and
- guide means for said selection mask, for guiding the selection mask with respect to the casing in such a way that said selection mask does not follow the rotation of the control shaft and of the engagement hub when a gear is engaged.

PRIOR ART

Gearboxes for motor vehicles generally comprise a primary shaft and a secondary shaft (at times even two parallel secondary shafts), set on which are pairs of gears that mesh with one another and wherein one gear of the pair is rigidly connected in rotation to one of the (primary or secondary) shafts whilst the other gear of the pair is mounted idle on the other shaft.

The forward gear ratios are hence obtained by gears that are always meshing with one another which transmit selectively the motion to the wheels of the vehicle by means of engagement devices that connect the idle gear in rotation to the respective shaft. In manually operated gearboxes, said devices, as is known to the person skilled in the branch, are synchronizers actuated via forks having moreover a forklike end, which functions as interface with a selection device for engagement of the gears.

As regards the reverse gear ratios, they are generally obtained with gears that are not always meshing with one another, and comprise a further speed step necessary for reversal of the direction of the motion transmitted to the wheels of the vehicle. The further speed step is generally obtained with an idle gear axially movable on a shaft parallel to the primary and secondary shafts. Said idle gear is made to mesh with a pair of gears, one on the primary and one on the secondary, thus obtaining a reverse gear ratio.

The operation of engagement of the reverse hence consists in moving axially the aforesaid idle gear until meshing with the other two gears that define the reverse gear ratio is obtained. It should be noted that in the present description the terms "reverse", "reverse gear", and "reverse gear ratio" are used with equivalent meaning.

It may happen in said operation that the primary shaft of the gearbox has a non-zero speed of rotation as a result of the inertia of rotation following upon cessation of the rotary movement in the direction corresponding to a forward gear (which had been engaged a few instants before). This occurs at times also with the vehicle completely stationary.

The existence of a residual speed of rotation of the primary shaft of the gearbox can lead to difficulties in meshing of the idle gear of the reverse gear ratio.

As a result, during engagement of the reverse there is, a typical squealing noise due to the repeated impact between the teeth of the idle gear and those of the remaining two gears of the reverse.

To overcome said problem a wide range of solutions have been proposed in the prior art aimed at obtaining a braking of the primary shaft of the gearbox, which still has a residual speed of rotation, so as to favour axial meshing of the idle gear forming part of the kinematic chain that defines the reverse gear ratio. Said braking is obtained in many cases by exploiting the synchronizers of the forward gear ratios.

However, the solutions currently available are found to have a non-negligible impact on the layout and on the components of the gearbox, as well as on the equipment necessary for the manufacturing of the required components.

Consequently, the implementation of any known solution on an already existing gearbox is somewhat inconvenient since it would entail such a complication and such an increase in costs as to render finally tolerable the occasional difficulty in meshing of the reverse.

OBJECT OF THE INVENTION

The object of the present invention is to solve the aforementioned technical problems. In the case in point, the object of the invention is to provide a device for selection and engagement of the gears of a gearbox for motor vehicles that will enable elimination of the difficulties of engagement of the reverse gear ratio and that will be adaptable to a gearbox already under production with minimal impact on the layout, on the structure, and on the costs of the gearbox itself.

SUMMARY OF THE INVENTION

The object of the invention is achieved by a device for selection and engagement of the gears of a gearbox for motor vehicles having the features forming the subject of one or more of the ensuing claims, which form an integral part of the technical teaching provided herein in relation to the invention.

In particular, the object of the invention is achieved by a device having all the features listed at the beginning of the present description and further characterized in that said means for guiding the selection mask are shaped in such a way that during an axial travel of the engagement finger towards an extreme position preliminary to the engagement of the reverse, the selection mask is forced to move temporarily into a rotated position, in which at least one of the fingers of the selection mask actuates at least one of the elements for actuating the forward gears of the gearbox in such a way as to cause the stop of the rotation of the primary shaft of the gearbox and consequently enable a subsequent regular and silent engagement of the reverse gear.

BRIEF DESCRIPTION OF THE FIGURES

The invention will now be described with reference to the annexed figures, provided purely by way of non-limiting example and wherein.

DETAILED DESCRIPTION OF PREFERRED EMBODIMENTS

Figure 1:
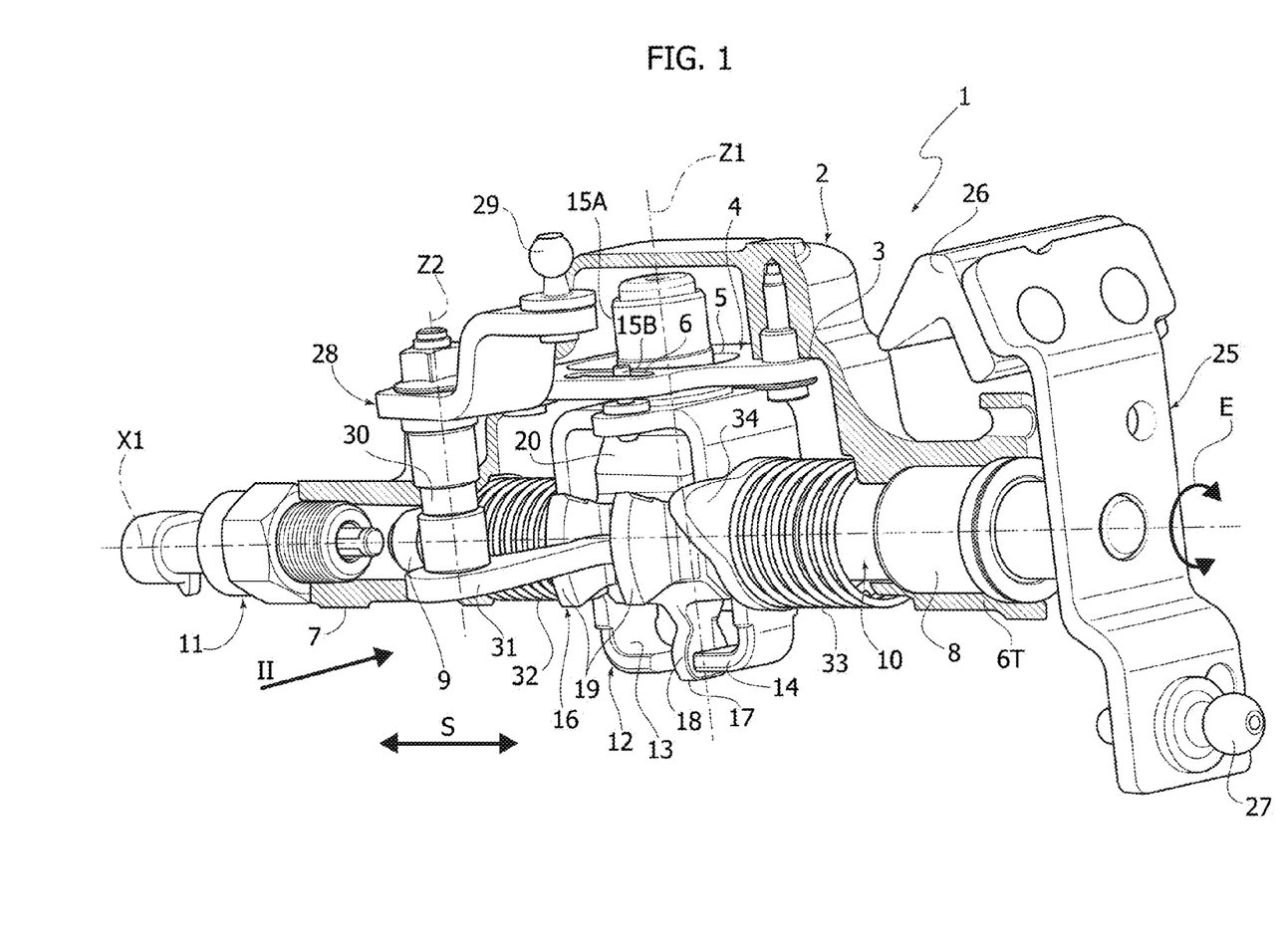
FIG. 1 is a partially sectioned perspective view of a device according to a preferred embodiment of the invention.

In FIG. 1 the reference number 1 designates as a whole a device for selection and engagement of the gears for a gearbox for motor vehicles according to a preferred embodiment of the invention.

The device 1 includes a fixed casing 2 that is fixed to a casing of the gearbox not illustrated either in FIG. 1 or in the subsequent figures.

Fixed within the casing 2, abutting on a contrast surface 3, is a guide element 4, in particular a guide plate, including a guide area 5 and a guide track 6.

In the preferred embodiment described herein, the guide plate 4 is substantially L-shaped and has:

the guide area 5 and the guide track 6 on a first flap; and a fretted groove 6C on a second flap.

Figure 3:
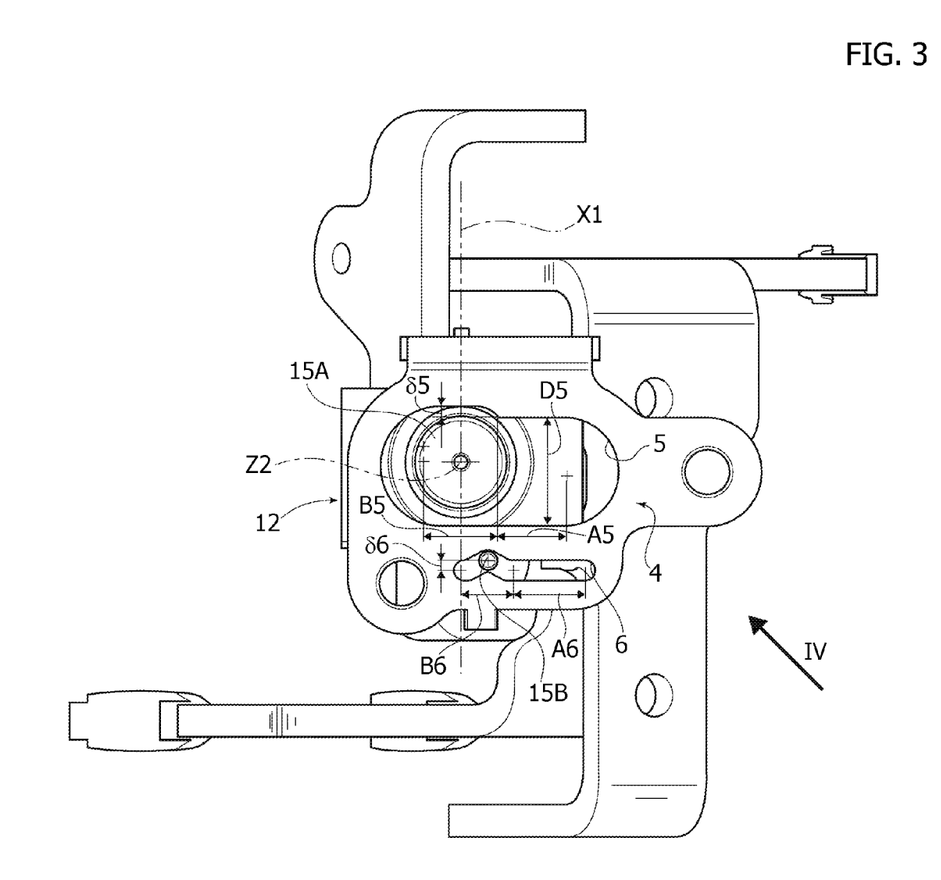
FIG. 3 is a view according to the arrow III of FIG. 2.
Figure 5:
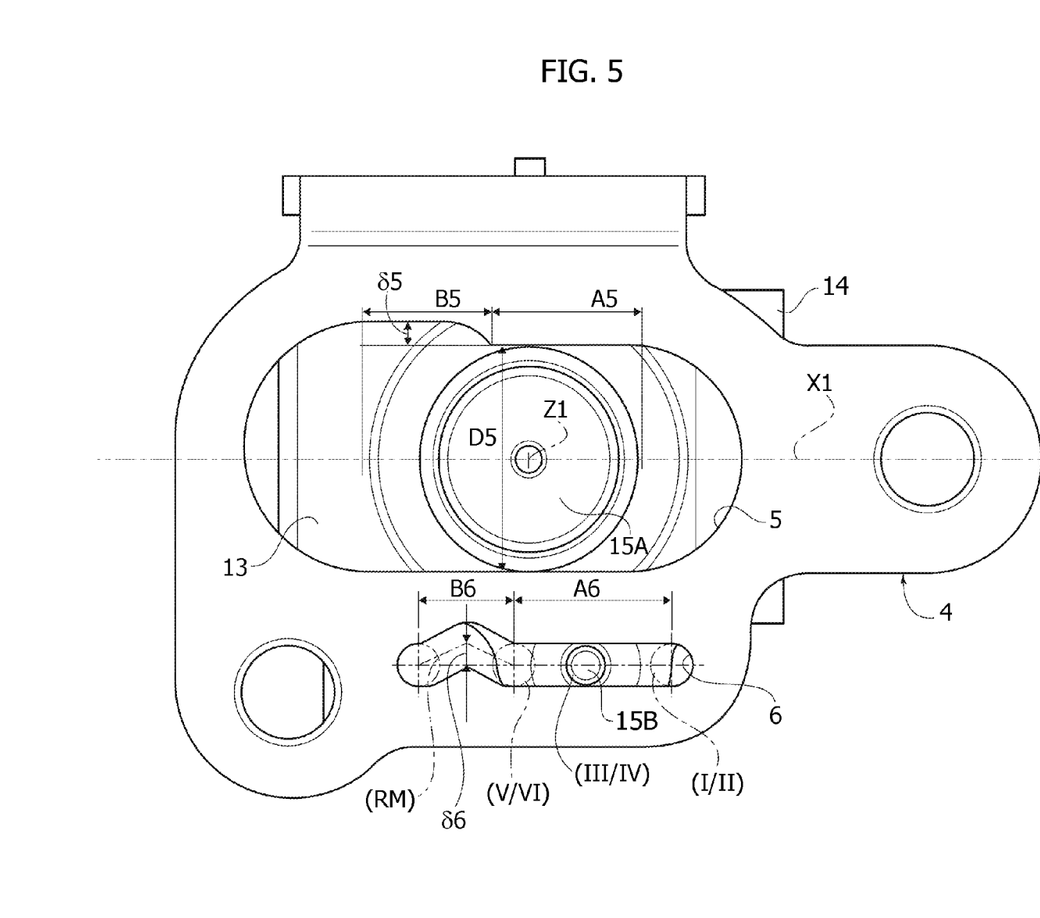
FIG. 5 is an enlarged view corresponding to that of FIG. 3 but illustrating a different operating condition.

With reference in particular to FIGS. 3 and 5, in the preferred embodiment illustrated (corresponding also to the views of the remaining figures) the guide area 5 assumes the form of a slot comprising a first stretch A5 having a first width D5 and a second stretch designated by B5, which has, instead, a width increased by an amount δ5 with respect to the width D5. Clearly, the same geometry could be recreated on a guide area that is, so to speak, "blind" such as a cam track (the slot 5 is, instead, "open" since it is a through slot).

The guide track 6 comprises a neutral stretch A6 on which an active stretch B6 engages. The neutral stretch A6 has a development substantially parallel with respect to the axis X1, whereas the active stretch B6 defines a deviation and a subsequent re-alignment with respect to the neutral stretch A6. Clearly, the deviation defined by the stretch B6 has a first component transverse to the axis X1 and a second component parallel thereto.

In this embodiment, the active stretch B6 is located at one end of the cam track 6 and, by virtue of the foregoing, has a path that terminates again on the path of the neutral stretch A6, even though there is no further prolongation of the latter. In other embodiments (for example, to compensate for any play or operating tolerances) it is possible to obtain a neutral stretch as a whole longer, so that the active stretch 6 can engage between two neutral stretches A6.

The maximum deviation in a transverse direction with respect to the neutral stretch A6 formed by the stretch B6 is designated by δ6. The amount δ5 is chosen as a function of the amount δ6, preferably with equivalent value.

The casing 2 further comprises a pair of tubular terminals 6T, 7 that function as seats for a first bushing 8 and a second bushing 9. Received within the bushings 8, 9 is a control shaft designated as a whole by the reference number 10 and having a first end received within the bushing 8 and projecting beyond the terminal 6T and a second end received within the bushing 9 and contained within the terminal 7.

Moreover installed on the terminal 7 is a sensor 11 for detecting an end position of the control shaft 10. The control shaft 10 moreover traverses a selection mask 12 including two fingers 13, 14, which face and are opposite to one another and are substantially L-shaped. Provided on the sides of each of said fingers is a through hole 15 (see FIG. 8). The through holes 15 provided on each of the fingers 13, 14 are coaxial and define a main axis X1 that coincides with the axis of the control shaft 10. Provided on the opposite side with respect to the fingers 13, 14 is a cylindrical stud 15A having one end projecting within the selection mask 12 and carrying a ball mounted on a spring. The stud 15A is housed movable within the slot 5.

Likewise provided on the selection mask 12 is a pin 15B with circular section (i.e., with a cylindrical shape) that engages within the guide track 6. Preferably, the stud 15A and the pin 15B are mechanically applied on the selection mask 12. The stud 15A and the pin 15B have parallel axes, and the stud 15A defines with its own axis a second axis of the device designated by Z1 and (preferably) orthogonal to the axis X1.

An engagement hub 16 is housed within the selection mask 12 and is fitted on the control shaft 10 and connected thereto in rotation. The engagement hub 16 includes a radial engagement finger 17 that preferably assumes the form of a flat finger with rounded sides 18.

The engagement hub 16 further comprises a pair of radial shoulders 19 extending in a direction orthogonal to the axis X1. The radial shoulders 19 are moreover axially spaced apart along the axis X1.

Finally, completing the engagement hub are:

a crest 20 bearing an axial groove with cylindrical section, within which the ball carried by the stud 15A engages; and a pin 23 that engages in the fretted groove 6C and is provided on an opposite side of the engagement hub 16 with respect to the radial shoulders 19.

A first actuation element 25 is connected in rotation to the control shaft at one end thereof opposite to the one facing the sensor 11. The first actuation element 25 is preferably made as a rocker having an inertial mass 26 set at a first end thereof and a ball head pin 27 fixed to a second end and configured for coupling with a metal cable of a Bowden type connected to a gear lever.

A second actuation element designated by the reference number 28 is, instead, mounted rotatable on the casing 2. The actuation element 28 is a rocker pivotally connected at a first end to the casing 2 and bearing a ballhead pin 29 at a second end. Like the ballhead pin 27, also the pin 29 is configured for connection to a Bowden cable connected to the gear lever.

The actuation element 28 is moreover connected in rotation to a pin 30, which has, at one end opposite to the rocker 28, a finger 31 having a head with rounded sides that fits between the radial shoulders 19 of the engagement hub 12.

The control shaft 10 is kept in a neutral position by means of a first elastic positioning element 32 and a second elastic positioning element 33 set on opposite sides with respect to the selection mask 12 and bearing at one end upon the casing 2 and at another end on a corresponding guide bushing 34, which in turn bears upon a corresponding one of the fingers 13, 14.

Figure 2:
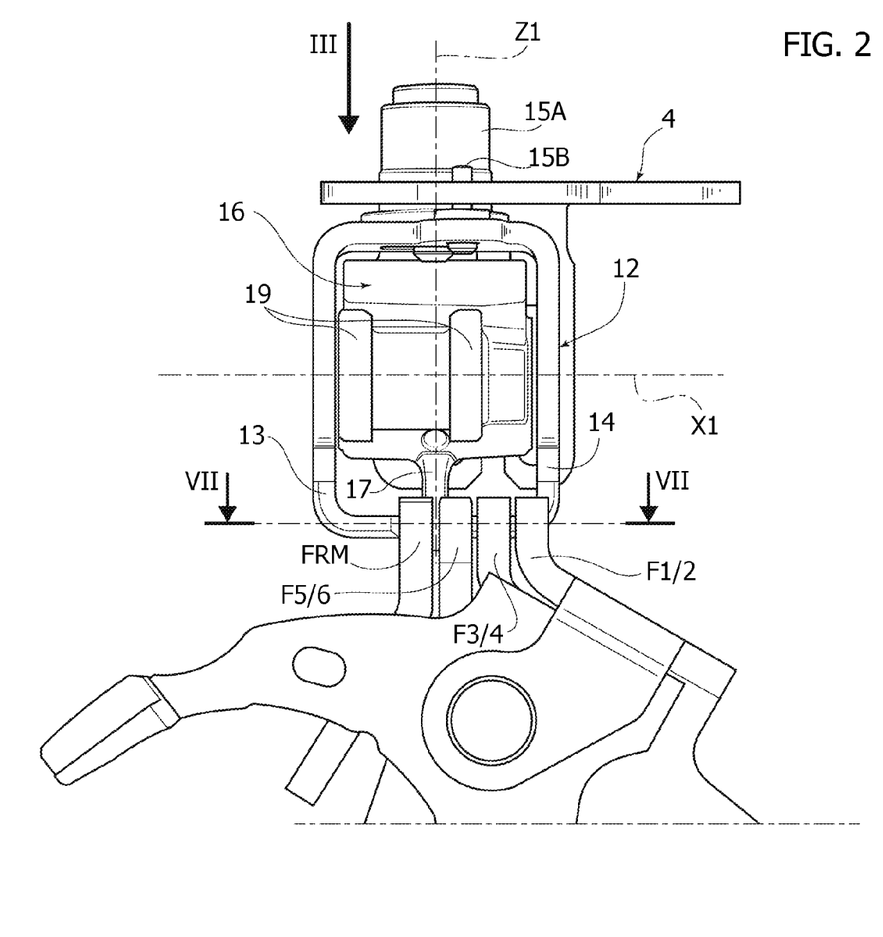
FIG. 2 is a view according to the arrow II of FIG. 1.

With reference to FIG. 2, the device 1 is provided for coupling with a plurality of forklike actuation elements engaged on synchronizers that perform the engagement of the various gear ratios.

In the case in point, in FIG. 2 it may be noted how the fingers 13 and 14 of the selection mask are positioned between forklike ends (visible moreover in the cross-sectional view in FIG. 7) of a first forklike actuation element, a second forklike actuation element, a third forklike actuation element, and a fourth forklike actuation element, designated respectively by the reference numbers F1/2, F3/4, F5/6 (for engagement of the forward gears) and FRM (for engagement of the reverse gear). Each forklike end defines a coupling seat for the radial engagement finger 17.

Each element F1/2, F3/4, F5/6 is movable between two extreme positions corresponding the engagement of two respective forward gears of the gearbox belonging to the same plane of selection (the numbers indicate what is the forward gear ratio; 1 for the first gear, 2 for the second gear, and so on).

The actuation element FRM is, instead, associated to a mechanism for the engagement of the reverse gear.

The fretted groove 6C previously mentioned reproduces a sequence of selection planes and of extreme positions of the actuation elements F1/2, F3/4, F5/6, FRM.

Operation of the device 1 is described in what follows.

With reference to FIG. 1, the arrows S and E indicate, respectively, a movement of selection and a movement of engagement of the control shaft 10, which is mounted rotatable (bushings 8, 9) and axially movable with respect to the casing 2. The selection movement S is along the axis X1 and is controlled by means of the second actuation element 28. In the case in point, the second actuation element 28 can be actuated in rotation about the axis Z2 to bring about a translation along the axis X1 of the engagement hub 16 that draws along the selection mask 12 and the control shaft 10. This is possible since the rotation of the actuation element 28 results in a corresponding rotation of the finger 31, which, being engaged between the radial sides, brings about translation of the hub 16. In this way, the forklike end of the actuation element within which the radial engagement finger 17 is to be engaged is selected. Note that the fingers 13 and 14 are shaped so that they too fit between the sides of the forklike ends of each actuation element not corresponding to the selection desired. In other words, the fingers 13, 14 prevent accidental and simultaneous engagement of two gears in so far as they block axial translation of the actuation elements whose forklike ends are not occupying a position corresponding to the radial engagement finger 17.

The radial finger 17 is substantially configured to oscillate within the space comprised between the two fingers, in particular between the facing ends thereof, during the engagement movement for controlling the elements for the actuation of the gearbox, as will now be described.

The engagement movement is governed by means of the first actuation element 25 that imparts a rotation on the shaft 10, which results in an equal rotation of the engagement hub itself. This moreover brings about an equal rotation, about the axis X1, of the radial engagement finger 17 that is engaged in one of the forklike ends of the actuation elements F1/2, F3/4, F5/6 or else FRM. The rotation of the radial engagement finger then brings about an axial translation of the actuation element towards an extreme position thereof, which bring about engagement of the corresponding gear.

Figure 4:
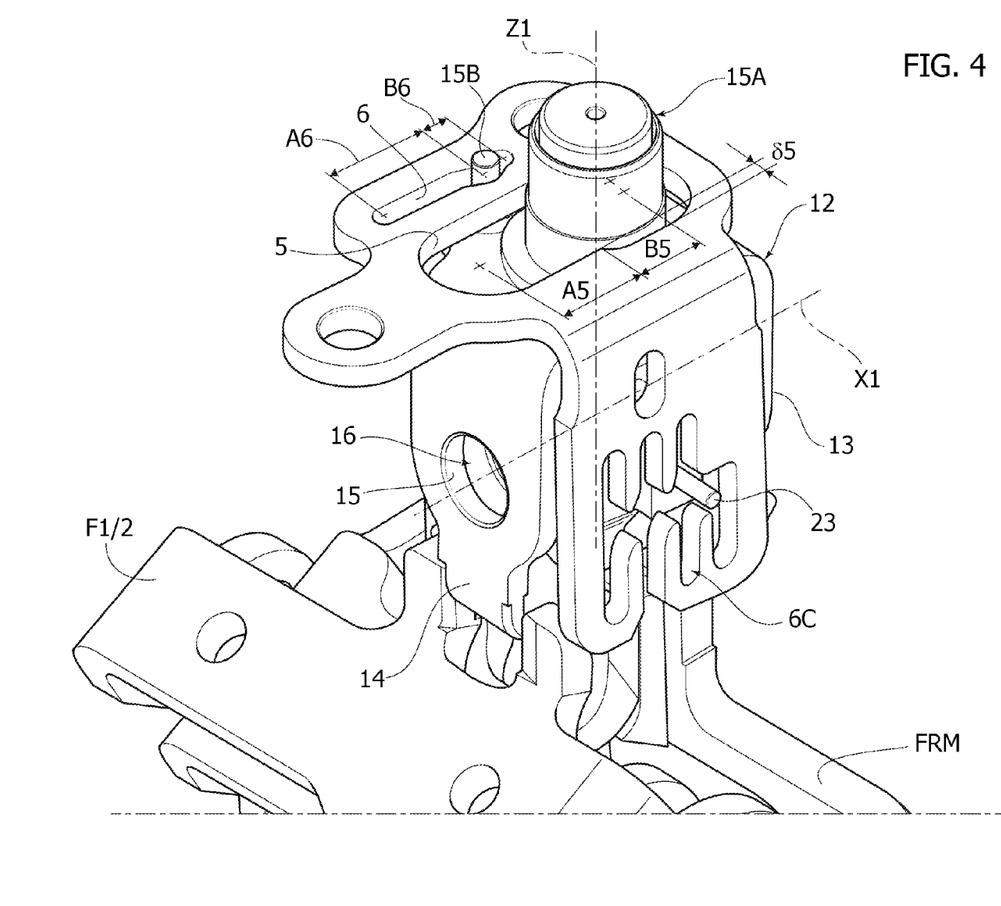
FIG. 4 is a perspective view according to the arrow IV of FIG. 3.

With reference to FIGS. 3 and 4, during the movement of selection the stud 15A is guided within the slot 5 whilst the pin 15B is guided within the guide track 6. In order to ensure at all times a correct movement of selection and engagement by the device 1, the pin 23 is movable with the engagement hub 16 and is guided within the fretted groove 6C. In this way, any irregular operation of the gearbox due to sticking is prevented.

As long as the motion of selection and engagement develops within the selection planes associated to the forward gears, the stud 15A and the pin 15B move along the axis X1 within the stretches A5 and A6.

The diameter of the stud 15A is substantially equal, but for the tolerances necessary for operation, to the width D5: in this way, any rotations and/or oscillations of the selection mask 12 about the axis X1 are prevented thanks to the guide provided by the sides of the slot 5. The selection mask 12 is thus doubly constrained in a transverse direction (control shaft and slot 5), and consequently cannot rotate. FIG. 5 illustrates in particular a condition where the pin 15B is in a position corresponding both to a condition of idle and to a condition of engagement of the third and fourth gears; i.e., there is no transverse movement of the selection mask.

The same applies to the other forward gears, except for the position along the axis X1. It may be stated, in practice, that the stud 15A and the pin 15B are in a resting position for all the forward gears.

For this purpose, indicated in FIG. 5 with a phantom line are the positions that the pin 15B assumes in the selection planes of the remaining forward gear ratios. The forward gear ratios have been designated by corresponding progressive Roman numerals (I, II, III, IV, V, VI) appearing in brackets. Where necessary, the reverse gear is designated by RM.

Consequently, visible on the right of the pin 15B in FIG. 5 is the position that the latter assumes when the radial engagement finger 17 is brought into the selection plane associated to the first gear (I) and second gear (II)—i.e., in the coupling seat obtained on the forklike end of the actuation element F1/2— whereas visible on the left is the position that is assumed by the pin 15B when the radial engagement finger 17 is brought into the selection plane associated to the fifth gear (V) and sixth gear (VI)—i.e., in a position corresponding to the coupling seat obtained on the forklike end of the actuation element F5/6. The position of the pin does not change when one of the aforesaid gears is engaged after the movement of selection.

Hence, selection of any one of the planes associated to the forward gears does not involve any displacement, in a direction transverse to the axis X1, of the pin 15B and of the stud 15A.

To the extreme left of the guide track 6 may be seen the final position of the pin 15B at the end of a manoeuvre of engagement of the reverse. In the passage from the selection plane associated to the fifth and sixth forward gears to a selection plane associated to the reverse gear ratio RM, the pin 15B must move through the active stretch B6.

Figure 6:
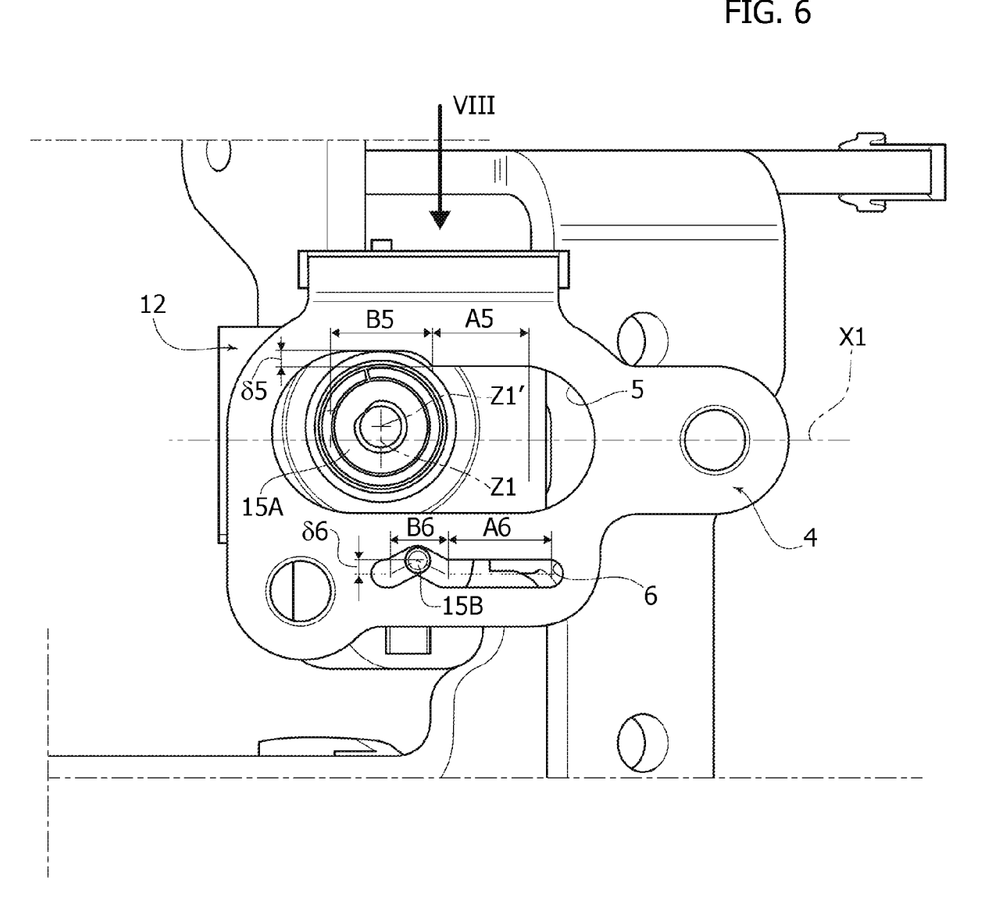
FIG. 6 is a perspective view corresponding to that of FIG. 5 but illustrating yet a further operating condition, substantially corresponding to that of FIG. 3.

What occurs in this step is illustrated in FIG. 6: the pin 15B is displaced in a direction transverse to the axis X1 by an amount equal to δ6. An identical displacement has been made by the stud 15A, which, on account of the greater axial displacement following upon selection of the plane corresponding to the reverse gear ratio, is now located within the stretch B5, and in particular is accommodated in an area created by the addition of the amount δ5 to the width D5.

Figure 7:
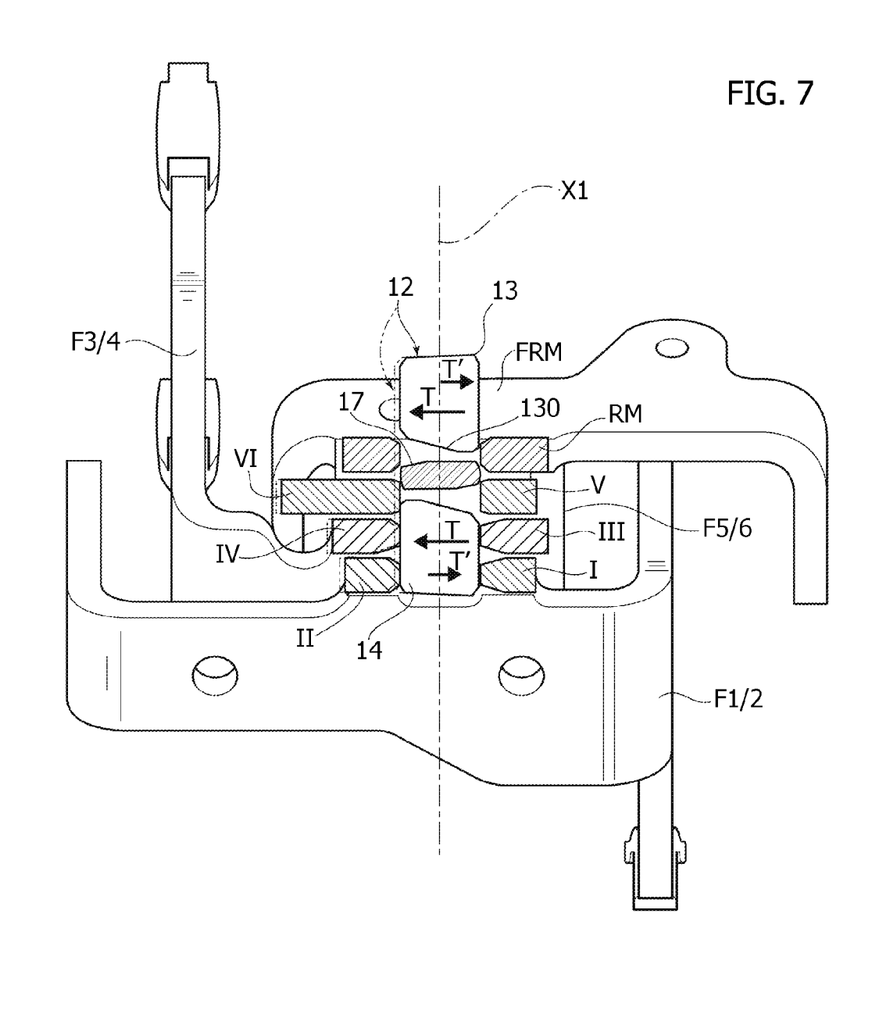
FIG. 7 is a cross-sectional view according to the trace VII-VII of FIG. 2.

Generalizing, with the additional aid of FIG. 7, it may be stated that the neutral stretch A6 must have a length (in a portion not interrupted by the active stretch B6) at least equal to an axial travel of the control shaft 10 necessary for bringing the radial engagement finger 17 from a first seat for coupling on a first actuation element (here, F5/6) operatively associated to a first pair of forward gears (here, V, VI) to a second seat for coupling of a second actuation element (here, F1/2) associated to a second pair of forward gears (here, I, II), where the first and second coupling seats occupy extreme positions in a sequence of adjacent coupling seats of actuation elements operatively associated to forward gear ratios. In FIG. 7, the sequence of coupling seats is defined by the forklike ends (visible in cross section) of the actuation elements F1/2, F3/4 and F5/6: the stretch A6 must consequently have a length at least sufficient to cover, with the selection mask 12, the distance between the coupling seats F1/2 and F5/6.

Consequently, the slot 5 increases in width in a stretch where the stud 15A is located in an area of transition between the selection plane of the fifth and sixth forward gears and the selection plane of the reverse since it is in said area that the pin 15B starts to traverse the active stretch B6.

Figure 8:
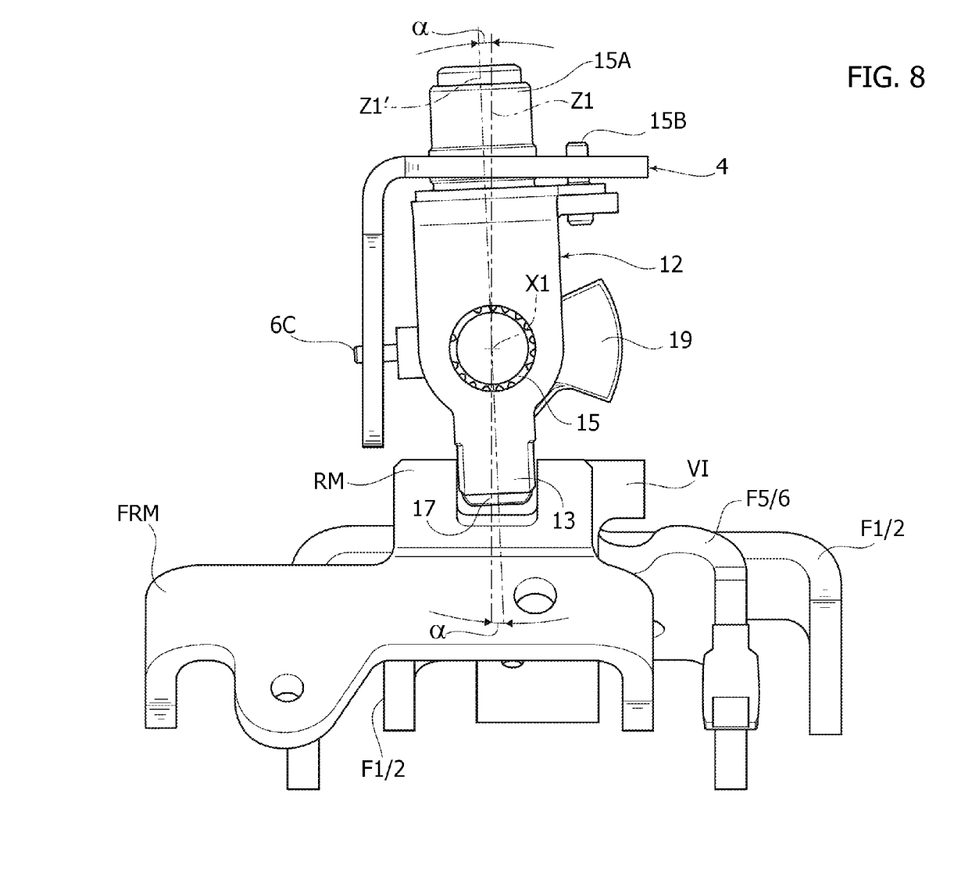
FIG. 8 is a view according to the arrow VIII of FIG. 6.

FIGS. 7 and 8 illustrate the position of the selection mask 12 when the stud 15A is shifted from its resting position in a direction transverse to the axis X1.

The selection mask 12 is in effect hinged at the axis X1 via the control shaft 10. A displacement in a direction transverse to the axis X1 of the stud 15A hence results in a rotation by an angle α of the selection mask 12 about the axis X1 itself.

At the end opposite to the stud 15A, the above brings about a translation in the direction indicated by arrows T in FIG. 7 (once again transverse with respect to the axis X1) of the fingers 13, 14, in particular of their ends, which are engaged within the forklike ends of the actuation elements F1/2, F3/4 and F5/6. The phantom line of FIG. 7 represents a shifted position where the selection mask 12 and the corresponding shifted positions where the actuation elements F1/2, F3/4 and F5/6.

Note that the actuation element FRM associated to the reverse gear does not undergo any displacement by the selection mask 12 in so far as the finger 13 preferably has a chamfer 130 that, in addition to accommodating the normal movements of the engagement finger 17 (especially in the manoeuvres of engagement that involve the passage between different planes of selection), avoids any contact between the finger 13 itself and the forklike end of the element FRM. Typical dimensions of the chamfer 130 are chosen in the ranges:

between 8 mm×10 and 10 mm×10, and
between 8 mm×20 and 10 mm×20.

Conversely, the elements F1/2, F3/4 and F5/6 are displaced in a direction and with a sense that tends to cause engagement of the second, fourth, and sixth forward gears.

Consequently, in the embodiment here illustrated, it is the only finger 14 that acts on the actuation elements F1/2, F3/4 and F5/6. It is, however, possible, in some variants, for both of the fingers 13, 14 to act on the actuation elements. It is moreover possible for just one of the actuation elements to be shifted by the finger 14. In this case, the finger 14 must be shaped so as to come into contact only with the actuation element that is to be displaced.

The amount δ6 is chosen in such a way that the displacement of the elements F1/2, F3/4 and F5/6 is sufficient only to complete the step of synchronization of the various gears, which causes braking of the primary shaft of the gearbox, which is still in rotation, but is not sufficient to create an actual engagement. For this reason, the amount δ6 is preferably comprised in the range 1.5 mm-2.5 mm.

The reason for this is that the aim is just to brake the primary shaft in the gearbox using the synchronizers as conical surface brakes so as to enable a subsequent regular and silent engagement of the reverse.

Note that, when the actuation elements F1/2, F3/4 and F5/6 undergo a displacement towards the respective end positions associated to engagement of the second, fourth, and sixth gears, the radial engagement finger 17 is not yet located at the forklike end of the element FRM. The position of the active stretch B6 thus brings about an advance of the action of the selection mask on the elements F1/2, F3/4 and F5/6 with respect to engagement of the reverse. Again in other words, the selection mask 12 and the radial engagement finger 17 are in an extreme position preliminary to the engagement of the reverse.

In FIG. 8, there may be noted the positions at rest and shifted of the stud 15A, where the shifted position is designated by the reference Z1' associated to the axis of the stud 15A.

There is thus necessary a further displacement in an axial direction of the selection mask of the engagement hub for the radial engagement finger 17 to be brought into a position corresponding to the forklike end of the element FRM. This brings the pin 15B again into a position aligned with the neutral stretch of the guide track 6, which consequently brings the stud 15A back into the resting position. For this purpose, it is hence necessary for the active stretch B6 to define a deviation and a subsequent re-alignment with respect to the neutral stretch A6.

What happens is a rotation of the selection mask 12 that brings the stud 15A back from the shifted position to the resting position and brings about a translation in a direction and with a sense T' opposite to the sense T of the fingers 13, 14.

This releases the action on the actuation elements F1/2, F3/4 and F5/6 bringing them back into a position intermediate between the two respective extreme positions (idle position).

In this way, it is impossible to complete engagement of the second, fourth, and sixth forward gears, but in the meantime the shaft of the gearbox that still had a residual speed of rotation has been braked, creating an optimal condition for engagement of the reverse gear, which can thus be completed with the usual modalities, i.e., by simply controlling a rotation of the engagement hub 16 to bring the actuation element FRM towards its (single) extreme position.

It may moreover be noted that in the embodiment described herein the guide track 6 has been shaped in such a way that shifting of the pin 15B results in an action of the fingers 13, 14 aimed at causing engagement of the even-numbered forward gears (second, fourth, and sixth).

Of course, by reversing the sense of the deviation created by the active stretch B6 it is possible to have an action of the fingers 13, 14, in a manoeuvre of selection of the reverse, in a sense that would bring about engagement of the odd-numbered gears (first, third, and fifth).

It is thus evident how the solution presented herein is particularly convenient from the standpoint of the ease of manufacturing and of reduction of the costs consequent upon implementation thereof on an already existing gearbox.

The person skilled in the art will appreciate how the components remain basically unvaried and the only additions and/or modifications that it is necessary to make with respect to a customary actuation device include:

provision of the guide track 6;
coupling of the pin 15B to the selection mask (possibly by creating a bracket, as illustrated in the figures);
local widening of the slot 5; and
creation of the chamfer 130 on the finger 13 or extension thereof (if it is already present, but has dimensions not suitable for the application).

The impact of said modifications on the overall cost of the device 1 with respect to a normal-production version (of a known type) without the aforesaid elements is decidedly negligible in the economy of the entire vehicle and does not require any particular or additional equipment with respect to the ones already commonly used on a production line.

In some variants it is moreover possible for the selection mask to have a chamfer 130 with dimensions outside the preferential ranges indicated above. In this case, there would be a further simplification of production (for example, because the dimensions already adopted for normal production would be maintained), but it is possible for the selection mask 12 to exert a slight action also on the actuation element FRM during braking of the primary shaft. However, said action would not have any effect in so far as any possible axial displacement of the element FRM would not result in any engagement of the reverse gear. In practice, nothing would change as regards operation: the actual action (i.e., with a useful effect) is always exerted on one or more elements for actuating the forward gears.

Note moreover that according to an advantageous aspect of the invention, it is possible to further reduce the impact on the costs of adaptation of an engagement device on the basis of the considerations outlined below.

The slot 5 and the guide track 6 define in effect guide means for the selection mask 12 and, in particular in the case of the cam track 6, are shaped in such a way that, during the axial travel of the engagement finger 17 towards an extreme position preliminary to the engagement of the reverse, the selection mask 12 is forced to move temporarily into a rotated position, in which at least one of the fingers 13, 14 of the selection mask 12 actuates at least one of the elements for actuating the forward gears. There is thus caused stop of rotation of the primary shaft of the gearbox, and a subsequent silent engagement of the reverse is consequently enabled.

On the basis of the foregoing, in a variant of the embodiment described herein it is possible to provide the slot 5 in such a way that it also performs the functions of the guide track 6, i.e., by shaping it with constant width and in a way that the slot 5 itself defines a neutral stretch and a deviated stretch having the same features and the same function as the neutral and deviated stretches A6, B6 of the guide track 6.

In this way, it would even be possible to avoid the installation of the pin 15B and the creation of the cam track 6. It would only be a matter of modifying the path of the cutting tool that forms the slot 5, and nothing more.

Of course, the details of construction and the embodiments may vary widely with respect to what has been described and illustrated herein, without thereby departing from the scope of the present invention, as defined by the annexed claims.

What is claimed is:

1. A device for selection and engagement of gears of a motor-vehicle gearbox, comprising:
   a casing;
   a control shaft mounted rotatable and axially movable with respect to the casing; and
   an engagement hub mounted on the control shaft and connected in rotation with respect thereto, said engagement hub having a radial engagement finger, for controlling actuation elements of the gears of the gearbox,
   wherein said radial engagement finger is configured to oscillate in a space comprised between two fingers of a selection mask, said selection mask being mounted on the control shaft and being moreover axially movable with the latter; and
   guide means of said selection mask for guiding the selection mask with respect to the casing in such a way that said selection mask does not follow a rotation of the control shaft and of the engagement hub when a gear is engaged,
   wherein said guide means of the selection mask are shaped in such a way that during an axial travel of an engagement finger towards an extreme position preliminary to an engagement of a reverse gear, the selection mask is forced by said guide means to move temporarily into a rotated position, in which at least one of the fingers of the selection mask actuates at least one of the actuation elements of forward gears of the gearbox in such a way as to cause a stop of the rotation of a primary shaft of the gearbox and consequently enable a subsequent regular and silent engagement of the reverse gear, and further
   wherein said guide means comprise
   a slot including a first stretch having a first width and a second stretch that has width increased with respect to said first width; and
   a guide track, engaged within which is a pin carried by said selection mask, wherein the guide track comprises a neutral stretch with a development parallel to a main axis of said control shaft and an active stretch that defines a deviation with respect to the neutral stretch and a subsequent re-alignment therewith.

2. The device according to claim 1, wherein the second stretch of said slot has a width increased with respect to said first width by an amount corresponding to a maximum deviation defined by said active stretch with respect to said neutral stretch.

3. The device according to claim 2, wherein said selection mask includes a stud movable within said slot, and
   wherein when said pin moves through said active stretch, the stud is located within the second stretch of said slot.

4. The device according to claim 2, wherein said maximum deviation is comprised within the range 1.5 mm-2.5 mm.

5. The device according to claim 1, wherein said neutral stretch has a length at least equal to an axial travel of said control shaft necessary for bringing said radial engagement finger from a first coupling seat on a first actuation element operatively associated to a first pair of forward gears to a second coupling seat of a second actuation element associated to a second pair of forward gears, wherein said first and second coupling seats occupy extreme positions in a sequence of adjacent coupling seats of actuation elements operatively associated to forward gear ratios.

6. The device according to claim 1, further including a guide plate fixed to said casing, wherein the guide plate is substantially L-shaped and has:
   on a first flap, said guide means; and
   on a second flap, a fretted groove, which reproduces a sequence of selection planes and of extreme positions of said actuation elements,
   wherein a pin carried by said engagement hub is movable therewith within said fretted groove.

7. The device according to claim 3, wherein said stud has a diameter equal to said first width of said slot.

8. The device according to claim 1, wherein one of said fingers includes a chamfer having dimensions chosen in the following ranges:
   between 8 mm×10 and 10 mm×10; and
   between 8 mm×20 and 10 mm×20.

* * * * *